UNITED STATES PATENT OFFICE.

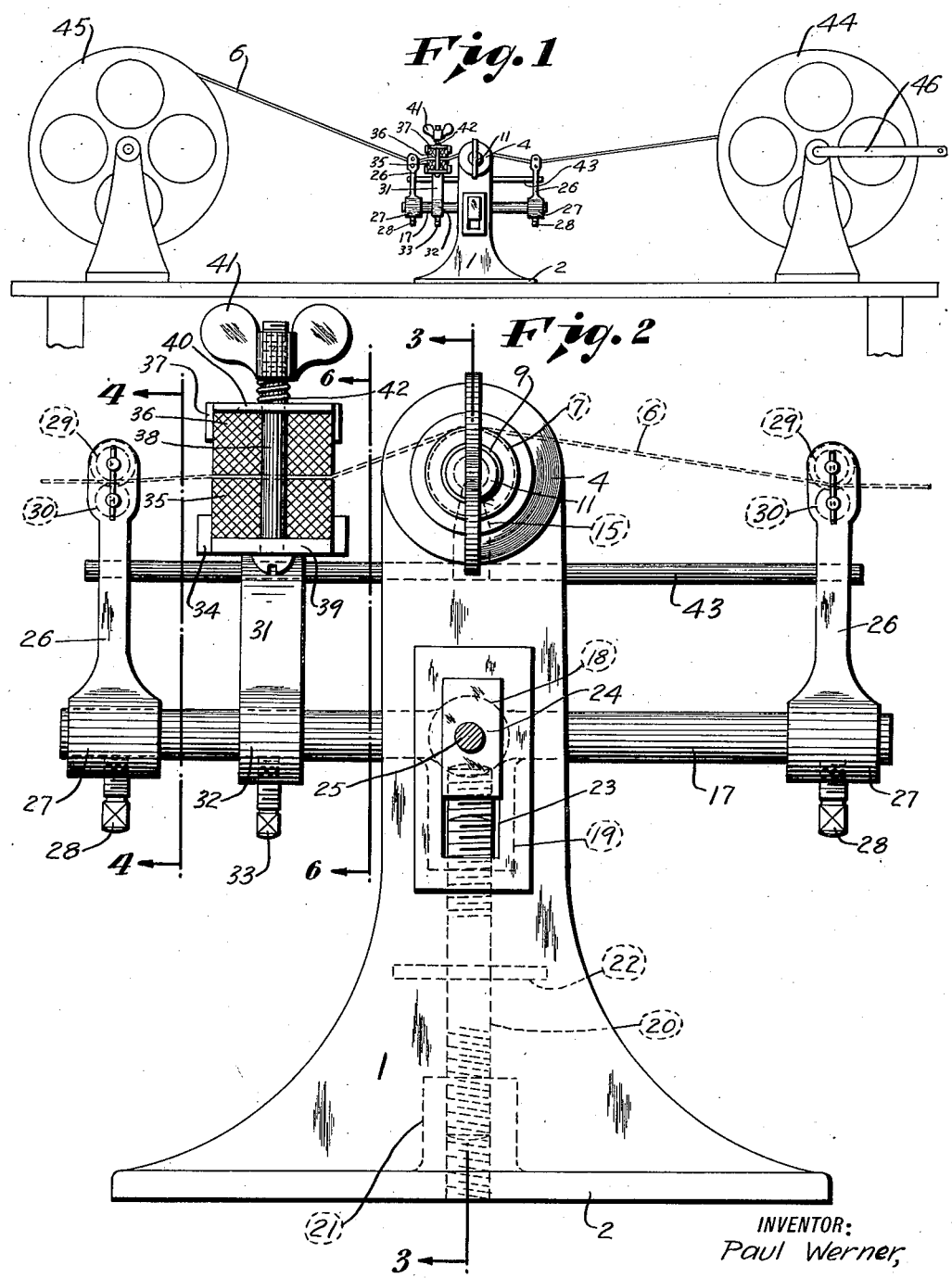

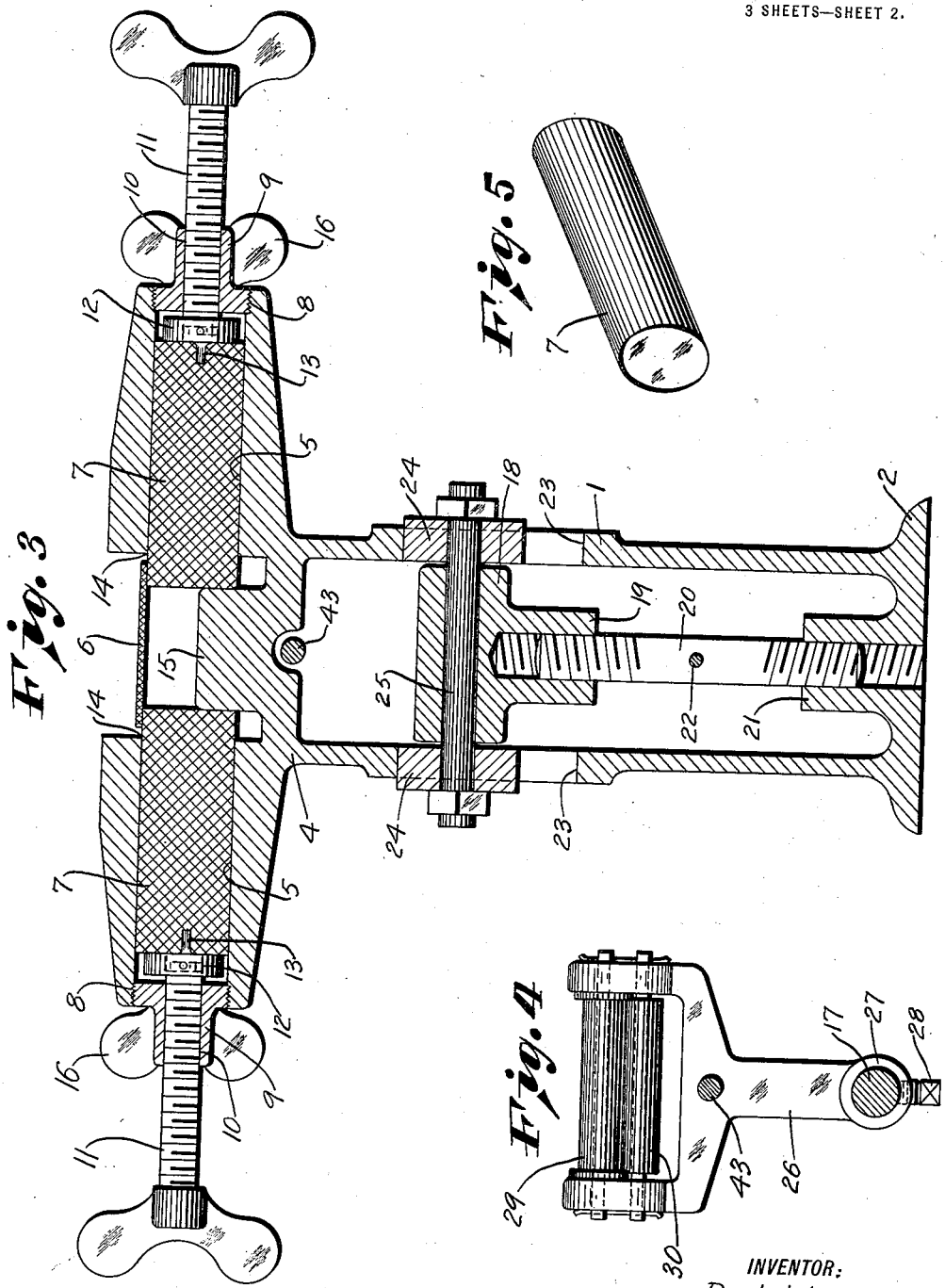

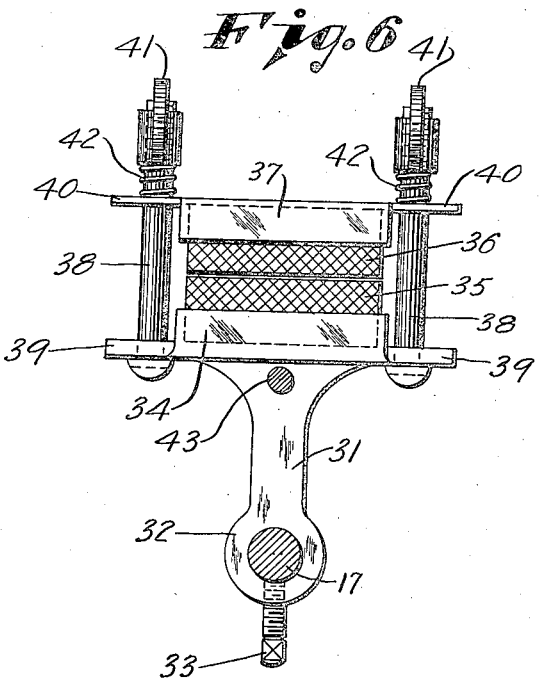
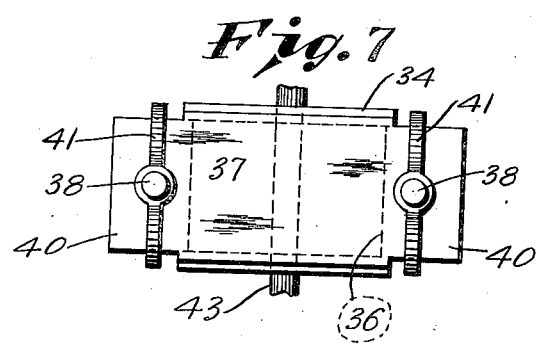

PAUL WERNER, OF ST. LOUIS, MISSOURI, ASSIGNOR, BY DIRECT AND MESNE ASSIGNMENTS, TO WERNER FILM-PROTECTOR MANUFACTURING COMPANY, OF ST. LOUIS, MISSOURI, A CORPORATION OF MISSOURI.

APPARATUS FOR SOFTENING MOTION-PICTURE FILMS.

1,352,712.   Specification of Letters Patent.   Patented Sept. 14, 1920.

Application filed April 7, 1919. Serial No. 288,421.

*To all whom it may concern:*

Be it known that I, PAUL WERNER, a citizen of the United States, residing at the city of St. Louis, in the State of Missouri, have invented certain new and useful Improvements in Apparatus for Softening Motion-Picture Films, of which the following is a specification.

This invention relates to improvements in motion-picture machinery and, more particularly, to improvements in apparatus for wiping or cleaning picture films and for moistening, waxing, lubricating, or anointing the edges of a film as the same is unwound from one spool and wound on to another in the operation of exhibiting the picture or otherwise.

It is customary for a row of perforations to be made in each motion-picture film near the edges thereof, each row extending from one end to the other of the film. These perforations in each row are so spaced apart as to fit the projections on a sprocket wheel in a motion-picture machine. Each of the said perforations in a row is rather close to its neighbor. Celluloid is so brittle and so easily torn and dries so easily and hardens that tearing from one perforation to another is difficult to avoid, and, moreover, when a film tears from one perforation to another, a crack is thereby started that is likely to extend a considerable distance and ruin the film. It costs many thousands of dollars to produce a film, and yet, in the case of the most valuable film, it may be destroyed and its usefulness ended by the splitting thereof along the line of the said perforations.

An object of the present invention is to provide a device of simple construction that will hold and apply a moistener, waxer, or lubricant for effectively moistening, waxing, or lubricating the perforated edges of the film during the unwinding or rewinding operation of the said film, so that the celluloid or the like will not become brittle and crack in the manner above described and so that films already showing a tendency to crack or harden may again become soft and pliable and in good condition for successful use.

Another object is to provide, in a device of the character described, mechanism for wiping or cleaning from films, during the process of unwinding same from one spool and rewinding it on another, in operation or otherwise, grease or oil or dirt which may have collected upon the film, the said wiping or cleaning being done by the device of the present invention preferably before the cleaned portion of the film is presented to that part of the motion-picture machinery where the picture is projected onto the screen and exhibited.

Another object is to provide, in the said device, mechanism for guiding the film effectively from the spool from which same is unwound toward and away from the cleaning and lubricating mechanism of this invention and to the spool on which the film is to be rewound.

Among the many advantages of this invention is the advantage that this device may be readily installed in connection with mechanism used for rewinding films after they have been exhibited, or in connection with a motion-picture projecting machine and the usual accompanying mechanism, and that, when so installed, the life of a film is much prolonged and a film already showing a tendency to become dry and brittle is restored to good condition during the process of exhibiting the same on a screen, although, of course, it is understood that the operation of moistening a film or of cleaning the same or either of the said operations may be performed, if desired, by means of the device of this invention at a time when the picture on the film is not being projected on a screen or otherwise exhibited and when the reel is being rewound after the picture has been exhibited.

When a film breaks during the operation of exhibiting the same, it is customary for the operator hurriedly to attach the broken ends together by means of a pin or the like so that the exhibition may be continued with little delay, and, as it is customary in ordinary practice for the inspector at the rewinding stations to feel the film for breaks with his fingers as the film is rewound, it often occurs that the inspector's fingers are torn and wounded by the pin or the like with which the operator has tacked together the broken ends of a film as above described. An advantage of the device of this invention is that, when the same is installed in connection with the rewinding mechanism at film-rewinding stations or the like, the film-guiding parts of the device of this invention will not permit pinned-together ends of a broken film to pass therethrough, and, as the inspector may do the work of inspecting at a point beyond the guides, injury to his fingers is avoided, and the guide mechanism of this invention, having automatically broken anew the pinned-together ends of a broken film, the inspector may effectively mend the broken ends in an appropriate manner for repairing same for renewed use before proceeding further with the rewinding process.

Other objects and advantages of this invention are hereinafter described, and are set forth in the claims.

In the accompanying drawings forming part of this specification, in which like numbers of reference denote like parts wherever they occur, Figure 1 is a side elevation of the device of this invention operatively installed between the unwinding and the winding spools of a motion picture film;

Fig. 2 is an enlarged view of the device of this invention shown in Fig. 1, with film unwinding and winding spools removed;

Fig. 3 is a cross-sectional view on the line 3—3 in Fig. 2 of the lubricating mechanism;

Fig. 4 is a cross-sectional view of a front elevation of one of the film guides, taken on the line 4—4 in Fig. 2, showing a detailed view of one of the film-guiding members and parts associated therewith;

Fig. 5 is a perspective view, in detail, of a form of the lubricant or emollient adapted for use in the device of the present invention;

Fig. 6 is a cross-sectional view taken on the line 6—6 in Fig. 2, showing in detail an elevation of the film wiping or cleaning attachment and parts associated therewith; and Fig. 7 is a plan view looking down upon Fig. 6.

Standard 1 may be of hollow or skeleton construction presenting spaced upright walls, as best seen in Fig. 3, and may have a base 2, of any suitable construction, adapted to support the standard and the other parts hereinafter described on table 3 or the like.

Emollient-holder 4, which may be substantially barrel-shaped, is borne by standard 1, and is provided with oppositely-extending bores or chambers 5, each open at both ends, the opposite open ends of said chambers being spaced apart sufficiently to form a passage of a width adapted for the passage of film 6 therethrough in the process of the operation hereinafter described.

An emollient 7, of any suitable composition of matter, may be inserted into each one of the chambers 5 through the far opposite open ends 8 of said chamber, which open ends 8 may be internally screw-threaded, as best seen in Fig. 3, said screw-threaded open ends being adapted to receive therein perforated plugs 9, the perforation 10 of said plugs being screw-threaded, and a screw-threaded adjusting pin 11 (which may be wing-headed or provided with any other suitable manipulating means) being mounted in each of said plugs and bearing push-plate 12, the inner face of each push-plate 12 being provided with a tooth or point 13 adapted to be embedded firmly in the adjacent end of emollient 7, so that said emollient may be turned within a chamber 5 as wing-headed pin 11 is turned or screwed in or out along its length, the opposite ends of said emollient 7 being adapted to extend outwardly from the mouth 14 of each chamber 5 sufficiently for the edges of film 6 to rest on the protruding ends of said emollient, as best seen in Fig. 3, a block 15 being adapted to limit the movement toward each other of two opposite emollients 7 mounted in opposite chambers 5 as their respective screw-threaded wing-headed pins 11 are operated to cause push-plates 12 to adjust the ends of said emollients 7 against opposite sides of the said block 15. For convenient operation of plugs 9, each of the same may be provided with a wing-head 16.

When the film-anointing ends of emollients 7 have been worn down so that film 6 is substantially adjacent the upper face of stop-block 15, wing-headed adjusting pins 11 may be screwed inwardly and the lower unworn portion of the anointing-ends of emollients 7 may thereby be turned upwardly against film 14 in anointing position, and the worn end-portion of said emollients may be adjusted against block 15 by appropriate manipulation of the said adjusting pin, and this adjustment may be continued until emollients 7 have been consumed, whereupon plugs 9 may be unscrewed from closing position and adjusting pins 11 removed from chambers 7 and new emollients inserted into said chambers and the adjusting pins 11, with plugs 9 mounted thereon, again inserted in the position shown in Fig. 3 and the parts adjusted as hereinabove described to cause the anointing ends of emollients 7 to perform the function of anointing the edges of film 6.

As hereinabove stated, emollient 7 may be any suitable composition of matter adapted for the purpose of anointing the film 7, and may be a composition such, for instance, as that described in my application for patent for a composition of matter filed of even date herewith, Serial No. 288,420 consisting of beeswax, paraffin wax, camphor, stearic acid and tallow, said emollient being formed in any suitable or convenient shape such, for instance, as the cylindrical or candle-shape illustrated in perspective in Fig. 5 of the accompanying drawings.

Arm-bar 17 may be borne by block 18 intermediate its two ends, and said block 18 is slidably mounted between the walls of standard 1, as best seen in Fig. 3, in any suitable manner such as that shown in the drawings, so that said block 18 and said arm-bar 17 may be adjusted slidable upwardly and downwardly of said standard 1, and, for this purpose, said block 18 may have a screw-threaded pit or flange 19 borne by its under-side to permit said block 18 to be mounted on one screw-threaded end of buckle-bar 20, the other end of said buckle-bar 20 being oppositely screw-threaded and mounted in screw-threaded pit or flange borne by base 2 of standard 1, one screw-threaded end of buckle-bar 20 bearing a right-hand thread and the opposite end bearing a left-hand thread, so that, when said buckle-bar 20 is appropriately rotated by means of finger pieces 22 or the like, the opposite screw-threaded ends of said buckle-bar 20, operating in their respective pits 19 and 21, will cause block 18 to slide up or down between the bifurcation of said standard 1. Opposite slots or openings 23 are formed in standard 1, and opposite bearings 24 are slidably mounted in said opening on opposite ends of pivot-bar 25, said bar 25 supporting slidably block 18 to support said arm-bar 17 pivotally, as best seen in Fig. 3, said bearings 24 being adapted to limit the upward movement of said slidable block 18 for the purpose of adjustment hereinafter described.

Adjacent each end of arm-bar 17, an upright 26 may be mounted in any suitable manner, such, for instance, as by means of eye-piece 27 and set-screw 28, by which means the uprights 26 may be adjusted along and on arm-bar 17 in any suitable position thereon. The upper end of each upright 26 may be bifurcated, as best seen in Fig. 4, and a pair of rollers 29 and 30, one above the other, may be mounted in said bifurcation in any suitable manner such, for instance, as that shown in Fig. 4 wherein the upper roller 29 is provided with a flanged end 31 adapted to engage and form a friction surface against the adjacent unflanged ends of lower roller 30, each pair of rollers 29 and 30 being adapted to receive therebetween film 6.

Intermediate an upright 26 and standard 1, a bracket 31 may be mounted on arm-bar 17 by any suitable means such, for instance, as by means of eye-piece 32 and set-screw 33, whereby said bracket may be set in any desired position adjusted on arm-bar 17, said bracket bearing plate 34 at its upper end, which plate is adapted to support a wiping member 35, another wiping member 36 being borne by plate 37, said plates 34 and 37 being oppositely disposed with the said wiping members 35 and 36 therebetween, a pair of bolts 38 or the like, mounted through perforated opposite flanges 39 and 40 borne respectively by plates 34 and 37, being provided with wing-nuts 41 and coil springs 42 for holding said plates 34 and 37 adjustably in position opposite each other with their respective wiping members 35 and 36 resiliently in wiping position under spring tension, so that film 6 may be drawn through between the wiping members 35 and 36 with wiping member 35 in frictional contact with the under-side of film 6 and wiping member 36 in frictional contact with the upper surface of film 6.

Wiping members 35 and 36 may be of any suitable material such, for instance, as a fibrous or porous material having absorbent or cleaning properties, the purpose of said wiping members being to clean off any dirt or oil or the like that may be on either side of the film.

Bar 43 may be provided as a stiffening or strengthening means, and may be mounted through appropriate openings in uprights 26 and bracket 31, as best seen in Fig. 2.

The operation of the device of this invention may be explained by referring to Fig. 1 where same is mounted on table 3 or the like between rewinding reel or spool 44 and film reel 45 from which a film 6 is in process of being rewound upon said rewinding reel 44, crank 46 being adapted for rotating rewinding reel 44 in a well-known manner. As film 6 comes from reel 45, it passes between the guide rolls 29 and 30, thence between wiping members 35 and 36, thence over and in contact with the anointing ends of the pair of emollients 7 so that the edges of the film are anointed, and thence between the second pair of guide-rolls 29 and 30 beyond said emollients and on to the rewinding reel 45 substantially in the manner illustrated in Fig. 1, the wiping members 35 and 36 functioning to clean the surface of the film 6 presented thereto, and the emollient member 7 functioning to anoint, with a suitable ointment, the edges of the said film to prevent drying, cracking, and hardening thereof as hereinbefore described, the position of the pairs of guide-rolls 29 and 30, borne by uprights 26 at opposite ends of arm-bar 17, being such, with reference to axes of reels 44 and 45 and the anointing surface of emollients 7 and with the wiping surfaces of wiping members 35 and 36, that film 6 is held taut and in frictional contact with said anointing surfaces and with said wiping surface at all times as said film is being rewound, the said relative position of parts being plainly illustrated in Fig. 1 of the drawings.

The buckle-bar 20 is adapted for adjusting slidable block 18 downwardly to take up the slack in film 6 as the anointing ends of emollients 7 are worn down in operation, and, also, to again adjust slidable block 18 upwardly when a new unworn anointing end of said emollients 7 is adjusted in practice to be presented in film anointing position so that at all times the desired tautness of the running film from reel 45 to rewinding reel 44 may be maintained to permit the cleaning and anointing mechanism and parts of the device of this invention to function effectively in the manner and for the purposes described.

Having thus described this invention, I hereby reserve the benefit of all changes in form, arrangement, order, or use of parts, as it is evident that many minor changes may be made therein without departing from the spirit of this invention or the scope of the following claims.

I claim:

1. A motion-picture film anointing device comprising mechanism for presenting anointing means to said film as the same is being rewound from one reel to another, wiping or cleaning means acting on said film, and guiding means for said running film between said reels and said guiding means being adjustable to adapt said running film to be held in frictional contact with said anointing means to compensate for the wear of such means.

2. A motion-picture film anointing device comprising mechanism for presenting anointing means to said film as the same is rewound from one reel to another, said mechanism comprising a holder for said anointing means, and means for rotatably and longitudinally adjusting said anointing means to said film.

3. A motion-picture film anointing device comprising mechanism for presenting anointing means to said film as same is rewound from one reel to another, said mechanism comprising a holder for said anointing means, screw-threaded means for adjustably presenting said anointing means to said film, and a member adapted to limit the presenting movement of said anointing means.

4. A motion-picture film anointing device comprising mechanism for presenting anointing means to said film while the same is rewound from one reel to another, said mechanism comprising means for adjustably presenting said anointing means to said film, said adjusting means being adapted for adjusting said anointing means longitudinally and axially.

5. A motion-picture film anointing device comprising mechanism for holding the anointing means in anointing position relative to said film while said film is being rewound from one reel to another, said mechanism comprising screw-threaded means for adjusting said anointing means toward and away from said film and for axially rotating said anointing means.

6. A motion-picture film anointing device comprising means for holding the ointment in anointing position relative to the film as said film is rewound from one reel to another, means for adjusting the ointment in said holder with relation to the film, guiding means adapted for guiding the film in its course from the unwinding reel to the rewinding reel, and means for adjusting said guiding means transversely of the path of movement of the stretch of film between said reels.

7. A motion-picture film anointing device comprising a standard, an ointment holder borne by said standard, means borne by said holder adapted for adjustably presenting the ointment in anointing position relative to a film while said film is being rewound from one reel to another, bifurcated means mounted intermediate its bifurcation on said standard, and guiding means borne by said bifurcated means and adapted to engage said film for guiding same in its course from the unwinding reel to said ointment and thence to said rewinding reel.

8. A motion-picture film anointing device comprising a standard, an ointment holder borne by said standard, means borne by said holder adapted for adjustably presenting the ointment in anointing position relative to a film while said film is being rewound from one reel to another, bifurcated means mounted intermediate its bifurcations on said standard, and guiding means borne by said bifurcated means and adapted to engage the film for guiding same in its course from the unwinding reel to said ointment and thence to said rewinding reel.

9. A motion-picture film anointing device comprising a standard, an ointment holder borne by said standard, means borne by said holder adapted for adjustably presenting the ointment in anointing position relative to a film while said film is being rewound from one reel to another, a block slidably mounted on said standard, the slidable adjustment of said block being screw-actuated, bifurcated means borne intermediate its bifurcation by said block, and guiding means borne by said bifurcated means and adapted to engage the film for guiding the same in its course from the unwinding reel to said ointment and thence to said rewinding reel.

10. A motion-picture film anointing device comprising a standard, an ointment holder borne by said standard, means borne by said holder adapted for adjustably presenting the ointment in anointing position relative to a film while said film is being rewound from one reel to another, a block slidably mounted on said standard, the slidable adjustment of said block being screw-actuated, bifurcated means attached intermediate its bifurcation to said block, and guiding means borne by said bifurcated means and adapted to engage the film for guiding the same in its course from the unwinding reel to said ointment and thence to said rewinding reel.

11. A motion-picture film anointing device comprising a standard, an ointment holder borne by said standard, bifurcated means mounted intermediate its bifurcation on said standard, and guiding means borne by said bifurcated means, said guiding means being adapted for engagement with the running film on each side of said holder to present film in engagement with the ointment to anoint the film as same is run from the unwinding to the rewinding reel.

12. A motion-picture film anointing device comprising an ointment holder in the path of the running film intermediate the unwinding and the rewinding reel and guiding means for the film mounted for vertical adjustment to adjust said film relative to said ointment to compensate for wear of the latter and means for wiping the surface of the film.

13. A motion-picture film anointing device comprising an ointment holder intermediate an unwinding reel and a rewinding reel and adapted for presenting ointment in the vertical plane of the path of a running film, and opposite sets of guiding means adapted to engage portions of said running film on opposite sides of said holder, and cleansing means borne by one set of said guiding means and adapted for engagement with the opposite faces of said running film for cleaning the same.

14. The combination with motion-picture film rewinding apparatus of a standard mounted intermediate the unwinding reel and the rewinding reel, an ointment holder borne by said standard, bifurcated means borne intermediate its bifurcation by said standard, and guiding means borne by said bifurcated means and adapted for engaging portions of said running reel on each side of said holder to direct said running film to and engage same with the ointment.

15. The combination with a pair of motion-picture film reels, from one of which the film is being unwound and the other on which the film is being rewound, of an ointment holder disposed between said reels, and bodily adjustable guiding means between said holder and said reels adapted to engage portions of the running film on each side of said holder and to direct the course of said running film to engage said film with the ointment.

16. The combination with a pair of motion-picture film reels, one from which the film is being unwound and the other on which the film is being rewound, of an ointment holder disposed between said reels, guiding means between said holder and said reels adapted for directing the course of running film to engaging position with the ointment, and means borne by a portion of the frame of said guiding means and having a portion adapted for engaging said running film for cleansing same.

17. A motion-picture film anointing device, comprising an ointment holder adapted to removably receive ointment material and means carried by said holder to limit operative movement of said material, said means consisting of a stop arranged in the path of movement of the ointment material.

18. An ointment holder for motion-picture anointing devices formed to adjustably receive opposed sections of ointment material, and means carried by said holder to limit projection of said ointment sections toward each other.

19. An ointment holder having alined ointment receiving sections and an intermediate stop-block to limit projection of the ointment in said sections toward each other.

20. An ointment holder having alined chambers to receive ointment sections, a stop block between the chambers to limit projection of the ointment sections toward each other, and means for adjusting said ointment sections within said chambers.

21. An ointment holder having alined chambers to receive ointment sections, a stop block between the chambers to limit projection of the ointment sections toward each other, and means for longitudinally and rotatably adjusting said ointment section within said chambers.

22. A motion-picture film anointing device, comprising an ointment holder adapted to removably receive ointment material, means carried by said holder to limit operative projection of said material, and vertically adjustable film-guiding means disposed in each direction beyond the ointment holder.

23. A film ointment holder, having alined spaced chambers to receive ointment sticks, means to limit the projection of such sticks beyond the proximate ends of the chambers to predetermine the engagement of such sticks and film, and means for adjusting said sticks relative to such limiting means.

24. A film ointment holder having opposed alined chambers to receive ointment sticks, means for limiting the movement of said sticks and an ointment-carrying member mounted in each chamber for longitudinal and rotary adjustment.

25. A film ointment holder having opposed alined chambers to receive ointment sticks, an ointment-carrying member mounted in each chamber for longitudinal and rotary adjustment, and a stop block between the chambers to limit longitudinal adjustment of the ointment sticks toward each other in the said adjusting movement of said members.

26. A machine of the character described embodying in combination, means for unwinding and winding the films, means for supporting and guiding the film, means for wiping the surface of the film and means for applying an ointment to the edges of said film, said guiding means and wiping means being bodily adjustable relative to the ointment-applying means.

27. A machine of the character described, embodying in combination, means for unwinding and winding the film, means for supporting and guiding the film, means for wiping the surfaces of the film and means for applying an ointment to the edges of said film, said guiding means and wiping means being simultaneously and independently adjustable with relation to the anointment-applying means.

28. A machine of the character described, embodying in combination, film supply and winding means, guiding, cleaning and anointing means, said cleaning means being adjustable in a plurality of directions relative to the anointing means.

29. A machine of the character described, consisting of a supply and winding reel and mechanism disposed between the said reels for guiding, cleaning and anointing a film, means for adjusting said guiding and cleaning means as a unit relative to the anointing means, and means to permit independent adjustment of the guiding and cleaning means relative to each other and to the anointing means.

30. In a machine of the character described, the combination of a pair of alined emollient sticks over which the edges of a film travel, means for limiting the movement of the sticks toward each other to thereby position them in proper relation to the film and means for laterally adjusting the sticks as they become worn to supply the proper amount of emollient to the edges of the film.

In testimony whereof I hereunto affix my signature.

PAUL WERNER.